United States Patent [19]

Hill

[11] Patent Number: 4,590,041

[45] Date of Patent: May 20, 1986

[54] GAS BAG INFLATORS

[75] Inventor: Robert W. Hill, Pleasant View, Utah

[73] Assignee: Morton Thiokol, Inc., Chicago, Ill.

[21] Appl. No.: 674,102

[22] Filed: Nov. 21, 1984

[51] Int. Cl.[4] .......................... B01J 1/00; B60R 21/28
[52] U.S. Cl. ...................................... 422/165; 280/741
[58] Field of Search .............. 422/164, 165, 120, 125, 422/126; 280/736, 742, 741 X

[56] References Cited

U.S. PATENT DOCUMENTS

| | | | |
|---|---|---|---|
| 3,838,977 | 10/1974 | Warren | 422/179 |
| 3,985,076 | 10/1976 | Schneiter et al. | 422/166 X |
| 4,131,299 | 12/1978 | Ono et al. | 280/736 |
| 4,249,673 | 2/1981 | Katoh et al. | 280/741 X |
| 4,278,638 | 7/1981 | Nilsson et al. | 422/165 X |
| 4,296,084 | 10/1981 | Adams et al. | 422/166 X |

Primary Examiner—Barry S. Richman
Assistant Examiner—Lynn M. Kummert
Attorney, Agent, or Firm—Gerald K. White

[57] ABSTRACT

A spring actuated annular movable plate in the combustion chamber of a pyrotechnic gas generator exerts a constant pressure on gas generant pellets therein to prevent relative movement and consequent abrasion and reduction to powder form of the pellets regardless of the extent to which they continue to settle relative to one another as the result of age and continued vibration of the vehicle in which the generator is installed thereby improving the long duration stability of the generator and avoiding overpressurization of the generator that tends to result upon degradation of the gas generant pellets.

9 Claims, 5 Drawing Figures

U.S. Patent  May 20, 1986  Sheet 2 of 2  4,590,041

GAS BAG INFLATORS

BACKGROUND OF THE INVENTION

1. Field of the Invention

The present invention relates to an improvement in pyrotechnic gas generators or inflators of the type that utilize the combustion of solid fuel gas generant pellets for the generation of gas for rapidly inflating vehicle passive restraint inflatable crash protection bags.

2. Description of the Prior Art

Many forms of pyrotechnic gas generators or inflators are known in the prior art. These, in general, include an ignition charge, a gas generant charge of a composite solid propellant comprising an organic binder, an inorganic oxidizing agent and additives such as a metal fuel, and suitable cooling and filtering provisions.

Pyrotechnic gas generators with concentric chambers including a central ignition chamber, a surrounding combustion chamber containing the gas generant charge, and an outer cooling and filtering chamber are known in the prior art. Forms of such gas generators are disclosed in U.S. Pat. No. 3,985,076 granted to Fred E. Schneiter et al. and in U.S. Pat. No. 4,296,084 granted to Gary V. Adams et al., both of which patents are assigned to the assignee of the present invention.

The gas generant composition is commonly incorporated in such prior art pyrotechnic gas generators in the form of small pellets having the general shape and size of aspirin tablets. Since these pellets are of uniform size with all of them having substantially the same surface area, the total burning surface area of the gas generant charge can be known or readily determined. Hence, when the gas generant charge is ignited, the rate at which gas is generated can be predicted with considerable accuracy. With age, and continued vibration with mutual pellet abrasion, however, there is a tendency for a fine powder of the gas generant composition to be produced. This can result in a much larger composition burning surface area than intended, and as a result, a possible overpressurization of the inflator.

An arrangement for solving this problem is disclosed in copending application for U.S. patent bearing Ser. No. 595,803, filed on Apr. 2, 1984 by Gary V. Adams et al., now U.S. Pat. No. 4,561,675, issued on Dec. 31, 1985, and assigned to the assignee of the present invention. In that application, there is disclosed a pyrotechnic gas generator having an annular chamber for the gas generant pellets. A press fitted annular disc or plate having a soft or sponge-like pad made of cerafiber on the side adjacent the pellets is pressed against the latter for holding them in place. As the pellets continue to settle against one another, however, so that the entire gas generant charge occupies less space, the annular plate can no longer apply pressure to the pellets. As a result, the plate is then ineffective to prevent mutually relative movement of the pellets.

It has also been proposed in the prior art to use a layer of foam for this purpose, but plastic or rubber foam tends to deteriorate with age, so that it is no longer resilient. Additionally, when the gas generant is ignited, such foams tend to produce toxic gases and/or disagreeable odors.

Long duration stability of pyrotechic gas generators is needed because of the expected longevity of use, which may be ten (10) years or more, of the vehicle in which the gas generator is installed. Thus, there is a need and a demand for an improvement in such generators for overcoming or at least minimizing the tendency toward degradation of the gas generant pellets with age and continued vibration.

SUMMARY OF THE INVENTION

An object of the invention is to provide a simple and effective solution to the foregoing problem.

Another object of the invention is to provide an improvement for a pyrotechnic gas generator wherein the gas generant pellets are maintained under a substantially constant pressure to prevent movement and abrasion thereof regardless of the extent to which they continue to settle relative to one another.

In accomplishing these and other objectives of the invention, there is provided a pyrotechnic gas generator having an annular chamber in which the gas generant pellets are contained. An annular disc or plate having a thin layer of cerafiber on the side adjacent the pellets is pressed against the pellets to hold them in place. The plate is not press fitted in the annular chamber but is sufficiently loose therein so that it may be moved by suitable spring means in response to any slack in the pellets. Thus, the plate exerts a constant pressure on the pellets to prevent movement and abrasion thereof. The spring means are selected to provide the necessary amount of travel for the plate, while exerting a constant pressure sufficient to maintain the pellets in snug fit but not great enough to crush them.

The spring means which may be made of a suitable metal such as spring steel will not deteriorate with age, nor will they contribute gases to the gaseous output of the gas generating pellets. Also, the initial shock of expanding gases caused by ignition of the gas generant pellets will be partially spent in forcing the plate against the spring action of the spring means to temporarily enlarge the volume of the annular chamber. This will result in a somewhat gentler initial discharge of gas from the gas generator into the inflatable crash protection bag.

BRIEF DESCRIPTION OF THE DRAWINGS

Having summarized the invention, a detailed description of the invention follows with reference being made to the accompanying drawings which form part of the specification, of which.

DESCRIPTION OF THE PREFERRED EMBODIMENT

Figure 1:
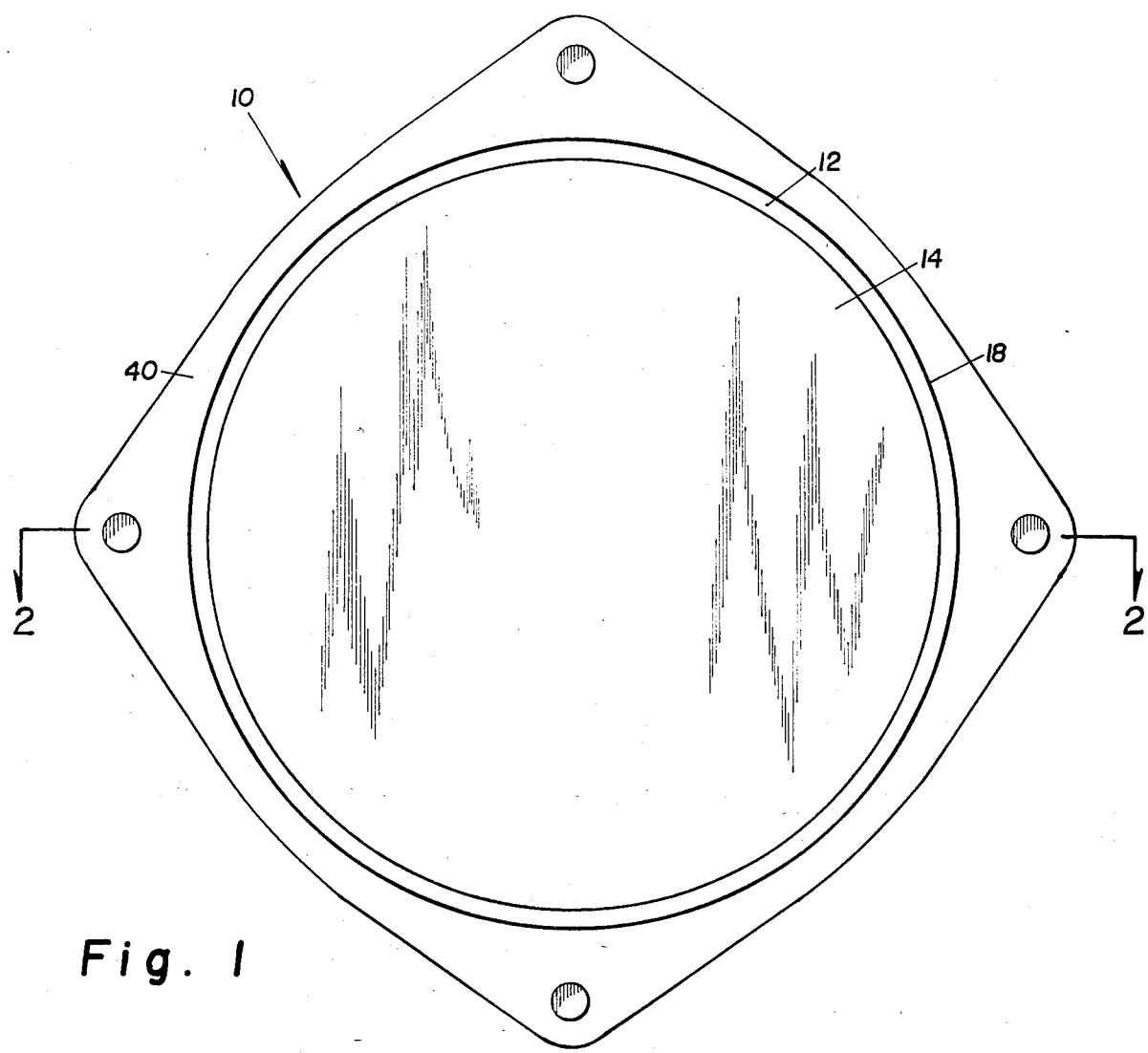
FIG. 1 is a top plan view of an improved pyrotechnic gas generator embodying the present invention.
Figure 2:
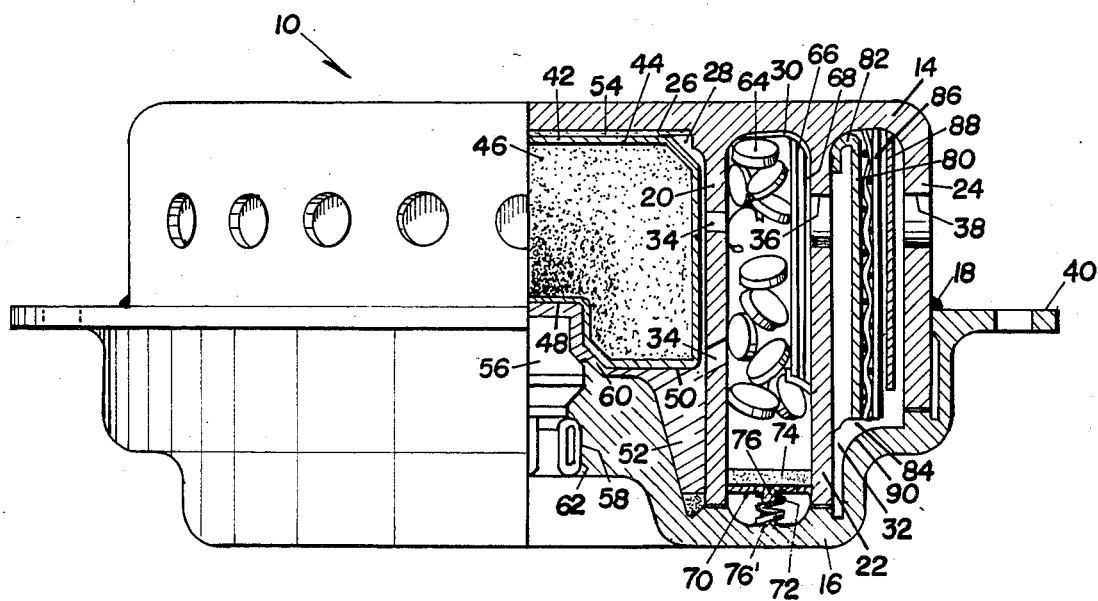
FIG. 2 is a side view of the generator, in partial cross section, taken along the lines 2—2 of FIG. 1.

The pyrotechnic gas generator or inflator assembly 10 according to the present invention has a generally cylindrical outline, as shown in FIGS. 1 and 2, and includes a housing construction 12 comprising two structural parts or components. The two parts, as shown in FIG. 2, comprise an upper shell or diffuser 14 and a lower shell or base 16 which are joined by a circumferential weld indicated at 18 to form the housing construction 12 of the generator assembly 10. Weld 18 may be effected in any suitable manner, as for example, by the known Heliarc method of welding.

The diffuser shell 14 may be formed by forging with three concentric cylinders 20, 22 and 24 which extend downwardly from a flat wall 26, as shown in FIG. 2, to the base 16. The inner cylinder 20, in cooperation with wall 26 and base 16 forms a cylindrical igniter chamber 28. The intermediate cylinder 22, in cooperation with the inner cylinder 20, wall 26 and base 16 forms an inner chamber having an annular shape, specifically a combustion chamber 30. The outer cylinder 24 in cooperation with the intermediate cylinder 22, wall 26 and base 16 forms an outer annular chamber 32, specifically a cooling and filtering chamber. Cylinders 20, 22 and 24 include a plurality of circumferentially uniformly spaced exit openings, ports or passageways indicated at 34, 36 and 38, respectively, through which the generated or inflation gas flows into an inflatable crash protection bag (not shown) to be filled.

The base 16 includes an interface attachment flange 40 that may be formed integrally therewith and which is used to attach the gas generator 10 to a vehicle the occupants of which are to be protected.

Positioned within the igniter chamber 28 is an igniter charge assembly 42 comprising a rupturable closed aluminum container 44 containing igniting material 46. Container 44 may be hermetically sealed against moisture, has a recess or cavity 48 formed in the bottom 50 thereof, and is retained in chamber 28 by a retaining ring 52. Retaining ring 52 has a shape conforming to the bottom 50 of container 44 including recess 48 and may be inserted in the end of chamber 28 in press fit relation therewith. At the top end thereof, container 44 is held in spaced relation with wall 26 by cushion/spacer material 54 which desirably may comprise a cerafiber material.

Although various pyrotechnic materials may be employed for igniter material 46, a preferred material is a granular mixture of 25% by weight of boron and 75% of potassium nitrate. This mixture has been found to burn with a very hot flame that is suitable for igniting the solid fuel gas generant material employed in the gas generator assembly 10, as described hereinafter.

Extending into recess 48 of container 44 but out of physical engagement therewith and with retaining ring 52, also, is an initiator 56. Initiator 56, as shown, has a conically shaped lower portion and is mounted in a hole 58 having a mating conically shaped upper portion, the hole 58 being provided at a central location in base 16. Initiator 56 is retained in hole 58 by a crimp 60 that is formed in base 16 at the upper end of hole 58 and which overlaps and engages the conically shaped upper portion of initiator 56. Initiator 56 may be a conventional electric squib having a pair of energizing electrical terminals (not shown) that are adapted for plug-in connection to external crash sensor means (not shown). A suitable adhesive 62 may be provided for sealing the initiator 56 in hole 58.

Contained within the annular combustion chamber 30 are uniformly distributed pellets 64 of a gas generant composition which may be any one of a number of compositions meeting the requirements of burning rate, non-toxicity, and flame temperature. One composition that may be utilized is that described in U.S. Pat. No. 4,203,787 granted to F. E. Schneiter et al. and assigned to the assignee of the present invention. Another composition that may advantageously be utilized is that described in U.S. Pat. No. 4,369,079 granted to Graham C. Shaw, which patent also is assigned to the assignee of the present invention.

Pellets 64 are surrounded by an annular inner screen pack or combustion chamber filter 66. Inner screen pack 66, as shown in FIG. 2, may desirably include a filtering layer 68 adjacent to the inner surface of concentric cylinder 22.

Pellets 64 are held in place in combustion chamber 30 by an aluminum washer-shaped retaining ring or plate 70. Plate 70 is positioned in chamber 30 adjacent base 16 and is urged into engagement with the pellets 64 by spring means comprising three spaced helical compression springs 72, a layer 74 of cerafiber desirably being provided on the side of plate 72 adjacent the pellets 64.

The plate 70 is sufficiently loose in chamber 30 to be capable of being moved by the springs 72 in response to any slack in the mass of the pellets 64. Thus, the plate 70 exerts a substantially constant pressure on the pellets 64 to prevent movement and abrasion thereof irrespective of the extent to which they continue to settle relative to one another. The springs 72 are designed to provide the necessary amount of travel for the plate 70, while exerting a constant pressure sufficient to maintain the pellets 64 in a snug fit but not great enough to crush them.

Figure 3:
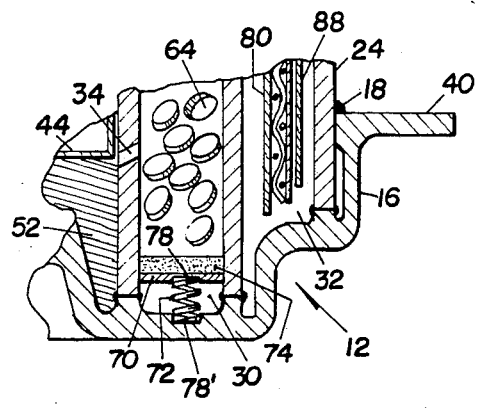
FIGS. 3-5 are fragmentary cross-sectional views illustrating modifications of the gas generator of FIGS. 1 and 2.
Figure 4:
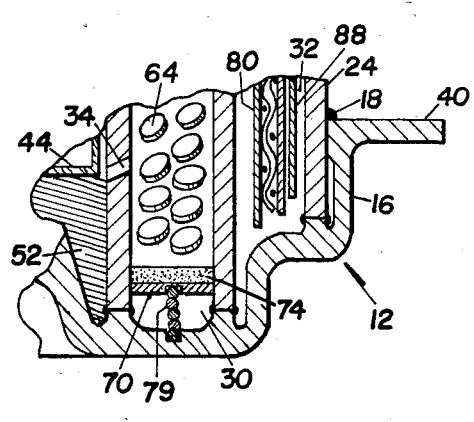

The three springs 72 may desirably be positioned 120° apart in the annular combustion chamber 30 with each of them being held in place by a projection 76 on plate 70 and a projection 76' on the lower end wall of chamber 30, that is, the base 16. Suitable recesses 78 and 78' may be employed as illustrated in FIG. 3, for holding the springs 72 in place instead of the projections 76 and 76', if desired. Alternatively, as shown in FIG. 4, the three springs 72 may be replaced by a single helical compression spring 79, the diameter of which may desirably be substantially equal to the mean of the inner and outer diameters of annular chamber 30. For reasons relating to weight and uniformity of pressure, however, the three small springs 72 illustrated are preferred.

In the outer annular chamber 32 of generator housing 12, an aluminum deflector ring 80 is provided in press fit relation with the outer surface of cylinder 22. Deflector ring 80 is formed with an inwardly directed curved flange 82 at its upper end. The length o f deflector ring 80 is selected so as to provide a circumferential or annular port 84 at the bottom thereof adjacent base 16. Alternatively, the length of deflector ring 80 may be selected so that the bottom thereof engages the base 16 in the assembled relation of the housing components 14 and 16, in which case a plurality of circumferentially spaced ports would be provided at the bottom of deflector ring 80.

Also included in the annular chamber 32 is a screen pack or filter 86. Screen pack 86 may desirably include a coarse filtering layer 88 adjacent the inner surface of cylinder 24.

Functioning of the gas generator assembly 10 begins with an electrical signal from a crash sensor (not shown) to the initiator 56. The initiator 56 fires into and pierces the closed aluminum container 44 that holds the igniter material 46. The igniter material 46 burns and bursts through the walls of container 44 and flows through the exit openings or ports 34 in the inner cylinder 20 and into the annular combustion chamber 30. The hot igniter gases ignite the gas generant pellets 64 which releases the nitrogen inflator gases. These gases flow through the inner screen filter pack 66 and radially outward through the exit ports 36 of combustion chamber 30. The screen filter pack 66 serves to cool the inflator gases and to remove particulate residue therefrom. As the gases exit the combustion chamber ports 36, they are turned downward by deflector ring 80 where they strike shoulder 90 on base 16. The shoulder 90 serves to interrupt the gas flow which helps to further remove particulate matter from the exhaust gases. The inflation gases then flow radially outward through the annular port 84 at the bottom of deflector ring 80 and up into the outer screen pack 86, through the latter, and finally, radially outward through the circumferentially spaced exit openings or ports 38. The outer screen pack 86 serves to further cool the exhaust gases and remove particulate matter.

Figure 5:
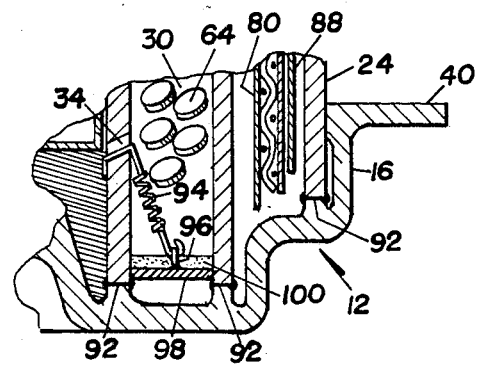

In FIG. 5 there is illustrated a modification of the gas generator of FIGS. 1 and 2 comprising another embodiment of the invention. This embodiment is characterized in that it enables the upper and lower shells 14 and 16 of housing 12 to be fastened together by inertial welding, as disclosed and claimed in copending application for U.S. patent bearing Ser. No. 595,774 filed Apr. 2, 1984 by Gary V. Adams et al. and assigned to the assignee of the present invention, the disclosure of which application, by reference, is incorporated herein. The use of helical compression springs 72, as shown in FIG. 2, makes such fastening of upper and lower shells 14 and 16 of housing 12 together impractical since inertial welding involves rotation of the upper and lower shells 14 and 16 relative to one another so that the interfaces, indicated at 92 become welded together.

In accordance with the embodiment of the invention of FIG. 5, the helical compression springs 72 have been replaced by helical tension springs 94. Three such tension springs 94 may be employed, spaced 120° apart in combustion chamber 30. Each spring 94 is fastened at one end by being hooked into an existing exit opening or port 34 in cylinder 20 and at the other end by being hooked into an eye 96 that may be stamped out of an annular plate 98 that is substituted for plate 72 of FIG. 2. Plate 98 includes a layer 100 of cerafiber on the side thereof facing pellets 64. Tension springs 94 exerts a constant force on plate 98 that is sufficiently loose in chamber 30 to move in response to any slack in pellets 64 to prevent any movement and abrasion thereof. Tension springs 94 also serves to keep the plate 98 and pellets 64 in place and separated from the spinning base 16 during the inertia welding process.

It is noted that during the inertia welding process, the base 16 is rotated beneath the inverted and loaded upper or diffuser shell 14 by power driven clutch means to a speed typically of about 3,000 revolutions per minute. Upon the attainment of such speed, the clutch is actuated to disconnect the power source and the freely spinning base is raised upward to bring the interfaces 92 together. The resulting friction stops the spinning of the base in a fraction of a second but raises the temperature of the areas of contact at the interfaces 92 sufficiently to cause consolidation thereat of the metal of the upper shell 14 and the base 16. Pressure is maintained for a short period, for example, a second or two, to allow the welds to solidify.

Thus, there has been provided, in accordance with the invention, an improvement in pyrotechnic gas generators or inflators for enabling long duration stability thereof during the expected life of ten (10) years or more of the vehicle in which the inflator is installed. The invention overcomes the tendency toward degradation of the gas generant pellets 64 with age and abrasion due to relative movement and settling of the pellets 64 resulting from continued vibration.

What is claimed is:

1. A pyrotechnic gas generator comprising two parts fixed relatively to each other and having wall means defining three concentric chambers including an inner chamber and surrounding intermediate and outer annular chambers with interconnecting passageways between said chambers and exit port means out of the outer chamber for the flow of generated gas,
   ignition means positioned in the inner one of said chambers,
   a pyrotechnic charge of pellets of uniform size contained within the intermediate one of said chambers, said pellets providing a predetermined burning surface area but tending as the result of age and vibration to settle one against another to produce a powder of larger surface area than said predetermined surface area,
   an annular plate positioned between said pellets and one of said parts in the intermediate one of said chambers, said plate being normally spaced from said one of said parts and having a resilient surface on the side adjacent said pellets,
   spring means positioned between said annular plate and said one of said parts and operative to exert a substantially constant pressure on said plate, said plate being sufficiently loose in the intermediate one of said chambers to be capable of being moved in response to any slack in said pellets to maintain said pellets in a snug fit but not enough to crush them, and
   filter and cooling means contained in said outer chamber,
   whereby the initial shock wave of expanding gases caused by ignition of said pyrotechnic charge is partially spent in forcing said plate to compress said spring means to temporarily enlarge the volume of said intermediate annular chamber thereby effecting a somewhat gentler discharge of gas through said outer annular chamber and the exit port means thereof.

2. A generator as defined by claim 1 wherein said spring means comprises a single compression spring, said spring being coaxial with said intermediate one of said chambers and having a diameter which is intermediate to the inner and outer diameters of the said intermediate one of said chambers.

3. A generator as defined by claim 1 wherein said spring means comprise a plurality of helical metal compression springs, said springs being equally spaced apart along a circumference of the intermediate one of said chambers.

4. A generator as defined by claim 3 wherein said helical springs are held in place by projections on said plate and on said one of said parts.

5. A generator as defined by claim 3 wherein said helical springs are held inplace by opposed recesses, one in said plate and the other in said one of said parts.

6. A pyrotechnic gas generator comprising two parts fixed relatively to each other and having wall means defining three concentric chambers including an inner chamber and surrrounding intermediate and outer annular chambers with interconnecting passageways between said chambers and exit port means out of the outer chamber for the flow of generated gas, ignition means positioned in the inner one of said chambers, a pyrotechnic charge of pellets of uniform size contained within the intermediate one of said chambers, said pellets providing a predetermined burning surface area but tending as the result of age and vibration to settle one against another to produce a powder of larger surface area than said predetermined surface area, an annular plate positioned between said pellets and one of said parts in the intermediate one of said chambers, said plate being normally spaced from said one of said parts and having a resilient surface on the side adjacent said pellets, spring means positioned between said annular plate and the other one of said parts and operative to exert a substantially constant pressure on said plate, said plate being sufficiently loose in the intermediate one of said chambers to be capable of being moved in response to any slack in said pellets to maintain said pellets in a snug fit but not enougn to crush them, and filter and cooling means contained in said outer chamber, whereby the intial shock wave of expanding gases caused by ignition of said pyrotechnic charge is partially spent in forcing said plate to compress said spring means to temporarily enlarge the volume of said intermediate annular chamber thereby effecting a somewhat gentler discharge of gas through said outer annular chamber and the exit port means thereof.

7. A generator as defined by claim 6 wherein said spring means comprise a plurality of tension springs spaced apart along a circumference of said intermediate one of said chambers, each having one end connected to said plate and the other end connected to the other one of said parts.

8. A generator as defined by claim 7 wherein said plate is provided with a plurality of eyes which are spaced along a circumference thereof and each of said tensions springs has a hook at each end with the hook at one end hooked on to an associated one of said eyes on said plate and the hook at the other end hooked on to a passageway in a wall means of the said other one of said parts.

9. A gas generator as defined by claim 8 wherein said two parts are made of aluminum and are joined together by a single inertia welding operation.

* * * * *